US009591808B2

(12) United States Patent
Lin

(10) Patent No.: US 9,591,808 B2
(45) Date of Patent: Mar. 14, 2017

(54) GARDENING SHEARS CAPABLE OF SWITCHING CUTTING MODES

(71) Applicant: Thomas Lin, Taichung (TW)

(72) Inventor: Thomas Lin, Taichung (TW)

( * ) Notice: Subject to any disclaimer, the term of this patent is extended or adjusted under 35 U.S.C. 154(b) by 209 days.

(21) Appl. No.: 14/191,024

(22) Filed: Feb. 26, 2014

(65) Prior Publication Data

US 2015/0237809 A1  Aug. 27, 2015

(51) Int. Cl.
*A01G 3/025* (2006.01)
*A01G 3/02* (2006.01)

(52) U.S. Cl.
CPC .......... *A01G 3/0251* (2013.01); *A01G 3/021* (2013.01)

(58) Field of Classification Search
CPC .... A01G 3/0251; A01G 3/021; A01G 3/0255; A01G 3/02; A01G 6/025; A01G 3/00; A01G 2003/023; B26B 17/00; B26B 17/02
See application file for complete search history.

(56) References Cited

U.S. PATENT DOCUMENTS

| 2,520,905 | A | * | 9/1950 | Borrelli | A01G 3/02 30/237 |
| 3,273,240 | A | * | 9/1966 | Florian | A01G 3/0251 30/192 |
| 3,390,455 | A | * | 7/1968 | Florian | B23D 29/026 30/190 |
| 5,511,314 | A | * | 4/1996 | Huang | A01G 3/0251 30/249 |
| 5,761,815 | A | * | 6/1998 | Lin | A01G 3/0251 30/140 |
| 2003/0123926 | A1 | * | 7/2003 | Lin | F16B 7/042 403/109.5 |
| 2003/0136008 | A1 | * | 7/2003 | Lin | A01G 3/0251 30/250 |
| 2007/0079512 | A1 | * | 4/2007 | Nelson | B25G 1/04 30/123.3 |
| 2009/0044412 | A1 | * | 2/2009 | Hsieh | A01G 3/0251 30/252 |
| 2010/0223794 | A1 | * | 9/2010 | Block | B26B 13/26 30/258 |
| 2011/0000026 | A1 | * | 1/2011 | Shan | B25G 1/04 7/135 |
| 2011/0126415 | A1 | * | 6/2011 | Huang | B26B 13/26 30/254 |

(Continued)

*Primary Examiner* — Jonathan Riley
(74) *Attorney, Agent, or Firm* — Muncy, Geissler, Olds & Lowe, P.C.

(57) ABSTRACT

A gardening shears includes a first blade, a driving arm pivoted to the first blade, a second blade pivoted to the first blade, and a link arm pivotally connected between the driving arm and the second blade. The bottom portion of the second blade has a sliding groove and positioning recesses. A switching device installed inside the driving arm is locatable at a first usage position where an end of the link arm is stationarily engaged with a positioning recess next to the top end of the sliding groove for enabling a direct cutting mode for cutting a small-sized branch, and a second usage position where the end of the link arm is slidable in the sliding groove and selectively engageable with one of the positioning recesses for enabling a stepwise cutting mode for stepwise cutting off a large-sized branch by changing the force-applying fulcrum.

6 Claims, 9 Drawing Sheets

(56) References Cited

U.S. PATENT DOCUMENTS

| | | | | |
|---|---|---|---|---|
| 2011/0283545 A1* | 11/2011 | Wu | ............................ | A01G 3/02 30/250 |
| 2012/0047750 A1* | 3/2012 | Maag | ........................ | A01G 3/02 30/251 |
| 2012/0060377 A1* | 3/2012 | Huang | ..................... | B26B 13/26 30/244 |
| 2012/0137527 A1* | 6/2012 | Huang | ................... | A01G 3/0251 30/185 |
| 2012/0186087 A1* | 7/2012 | Huang | ................... | A01G 3/0251 30/252 |
| 2013/0031786 A1* | 2/2013 | Wang | ...................... | A01G 3/021 30/251 |
| 2013/0205601 A1* | 8/2013 | Wu | ............................ | B25G 3/38 30/255 |
| 2014/0053413 A1* | 2/2014 | Huang | ................... | A01G 3/0251 30/250 |
| 2014/0115902 A1* | 5/2014 | Wu | ....................... | A01G 3/0251 30/272.1 |
| 2014/0215834 A1* | 8/2014 | Wang | ................... | A01G 3/0251 30/251 |
| 2014/0317937 A1* | 10/2014 | Descombes | ........... | A01G 3/0251 30/192 |
| 2015/0135914 A1* | 5/2015 | Cunningham | ........ | A01G 3/0251 83/13 |
| 2015/0208589 A1* | 7/2015 | Chou | ..................... | A01G 3/021 30/251 |
| 2015/0237809 A1* | 8/2015 | Lin | ......................... | A01G 3/021 30/252 |

\* cited by examiner

GARDENING SHEARS CAPABLE OF SWITCHING CUTTING MODES

BACKGROUND OF THE INVENTION

1. Field of the Invention

The present invention relates generally to gardening implements and more particularly, to a gardening shears that is capable of switching cutting modes.

2. Description of the Related Art

There are basically two types of conventional gardening shears. The first type uses the force exerting on the handles of the gardening shears by the user to directly drive the two blades to pivotally move relative to each other so as to cut off the tree branch. This design of direct cutting mode is suitable for cutting the tree branch having a small diameter. When it is used to cut a tree branch with a large diameter, the user may not be able to cut off the big-sized branch in one cutting stroke due to the fact that the user may receive excessive reaction force during the cutting process. Under this circumstance, the user may take a lot of effort to achieve the cutting purpose by repeatedly operating the gardening shears of the first type.

The conventional gardening shears of the second type is designed to have a stepwise cutting mode by adopting some special structures. By means of repeatedly performing the cycle of applying force on handles for closing the handles and then applying reverse force on the handles for opening the handles, a stepwise cutting motion can be achieved for gradually cutting the big-sized branch off under a labor-saving situation. However, if this type having the stepwise cutting mode is used to cut a small-sized branch, it is also needed to perform the aforesaid stepwise cutting motion in order to complete the cutting process. This is time-consuming and inconvenience in cutting of the small-sized tree branch.

As far as is known, there is no such a design combining the above-mentioned two cutting modes in a conventional gardening shears. For saving money, user may usually buy one of the two types of gardening shears. No matter which type of the gardening shears is used by the user, the user will encounter the above-mentioned operational disadvantages, which may deteriorate the cutting efficiency.

SUMMARY OF THE INVENTION

The present invention has been accomplished under the circumstances in view. It is an objective of the present invention to provide a gardening shears, which is switchable between two cutting modes so as to fulfill the flexible requirement in cutting process.

To attain the above-mentioned objective, a gardening shears provided by the present invention comprises a first blade, a driving arm, two handles, a second blade, a link arm, a spring, and a switching device. The driving arm has a top end pivotally connected with the first blade. The top ends of the two handles are fixedly connected with a bottom end of the first blade and a bottom end of the driving arm, respectively. The second blade is pivotally connected with the first blade and provided with a sliding groove having a side wall, and a plurality of positioning recesses linearly arranged at the side wall of the sliding groove. The link arm has a stop notch, a first pivot end adjacent to the stop notch, and a second pivot end. The first pivot end is pivotally connected with the driving arm via a first shaft. The second pivot end is pivotally connected with the second blade via a second shaft which is slidable in the sliding groove of the second blade and engageable with one of the positioning recesses selectively. The spring is connected between the driving arm and the first pivot end of the link arm for providing an elastic force on the link arm for moving the second shaft of the link arm towards a top end of the sliding groove of the second blade. The switching device includes a control latch, a moveable plate, and a stop pin. The control latch is upwardly and downwardly moveable in an external guide groove of the driving arm. The moveable plate is disposed at the driving arm and connected with the control latch. The stop pin is connected with a top portion of the moveable plate.

By means of the above-mentioned design, when the moveable plate is driven by the control latch to move to a first usage position, the link arm will be pulled by the driving arm during an opening process of the handles to enable the second shaft to be engaged inside the top end of the sliding groove until the stop pin is stopped at the first pivot end of the link arm. In addition, in the process of closing the handles, the second shaft will be forced by the link arm to be engaged with the one of positioning recesses next to the top end of the sliding groove so as to drive the second blade to undergo a cutting motion until the tree branch having a small diameter is cut off by one single cutting stroke. On the other hand, when the moveable plate is driven by the control latch to move to a second usage position, the first pivot end of the link arm will be pushed by the stop pin during an opening process of the handles to force the second shaft to downwardly slide along the sliding groove, and in addition, the link arm will drive the second shaft into one of the positioning recesses during the closing process of the handles so as to drive the second blade to undergo a cutting motion. Repeatedly performing the opening and closing processes of the handles, a tree branch having a large diameter can be stepwise cut off by changing the force-applying fulcrum.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF EMBODIMENTS

Figure 1:
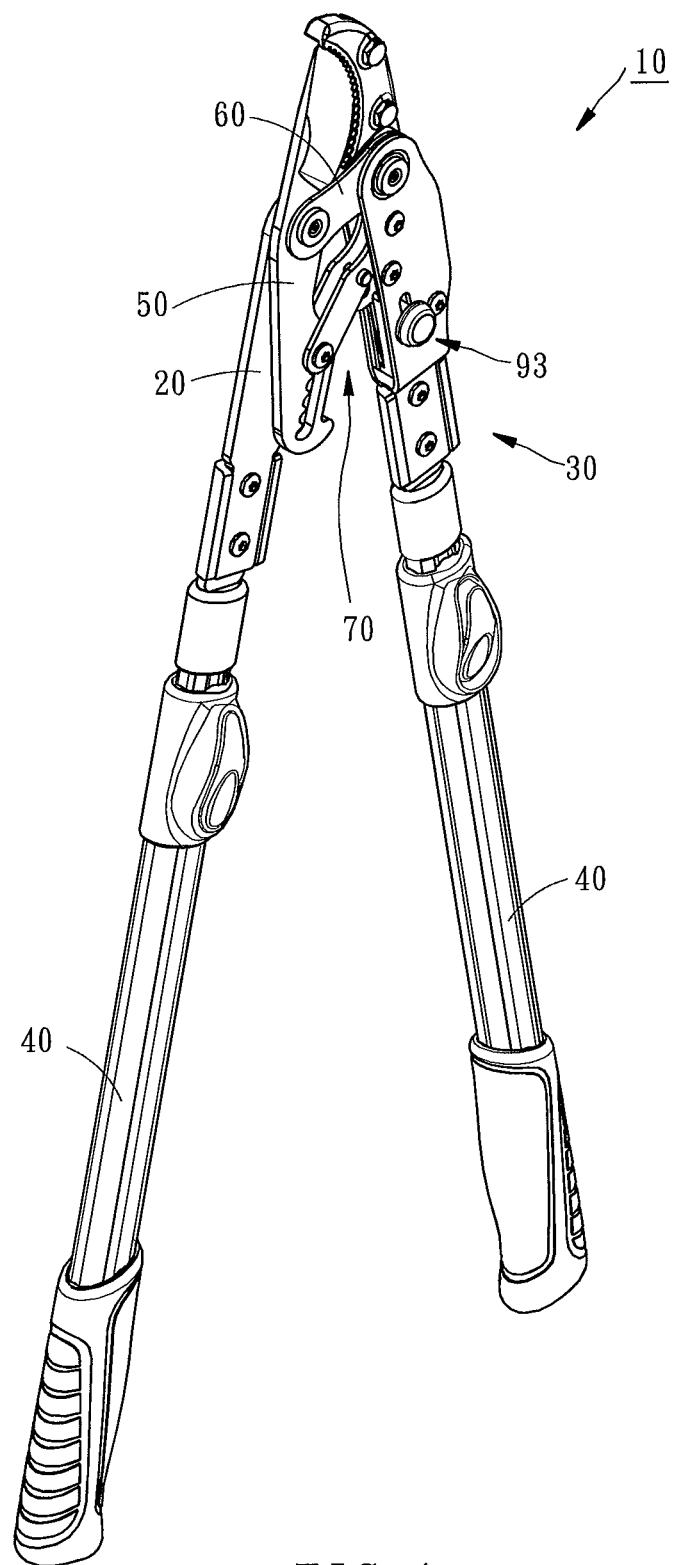
FIG. 1 is a perspective view of a gardening shears according to an embodiment of the present invention.
Figure 2:
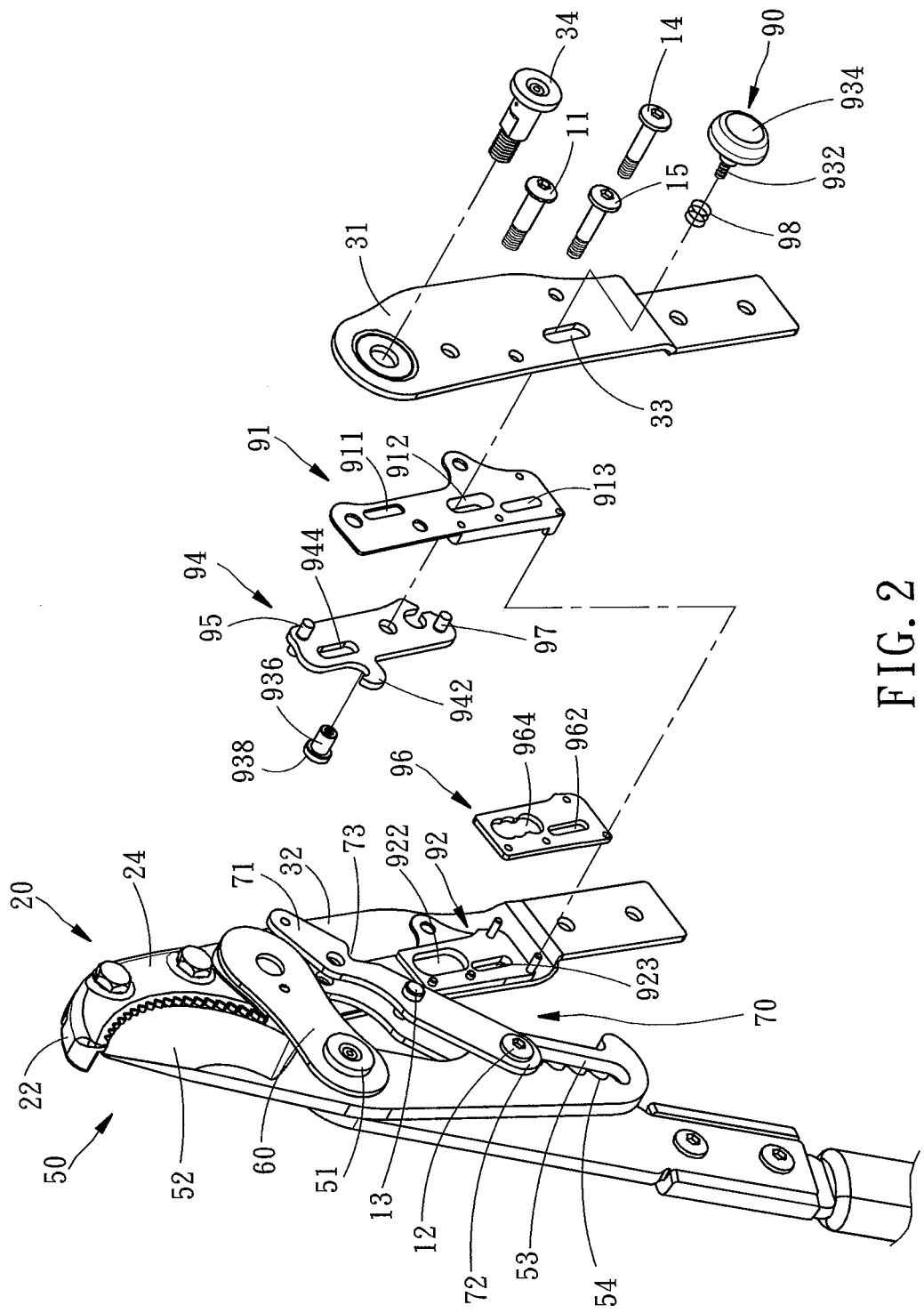
FIG. 2 is an exploded view of a part of the gardening shears of the present invention.
Figure 5:
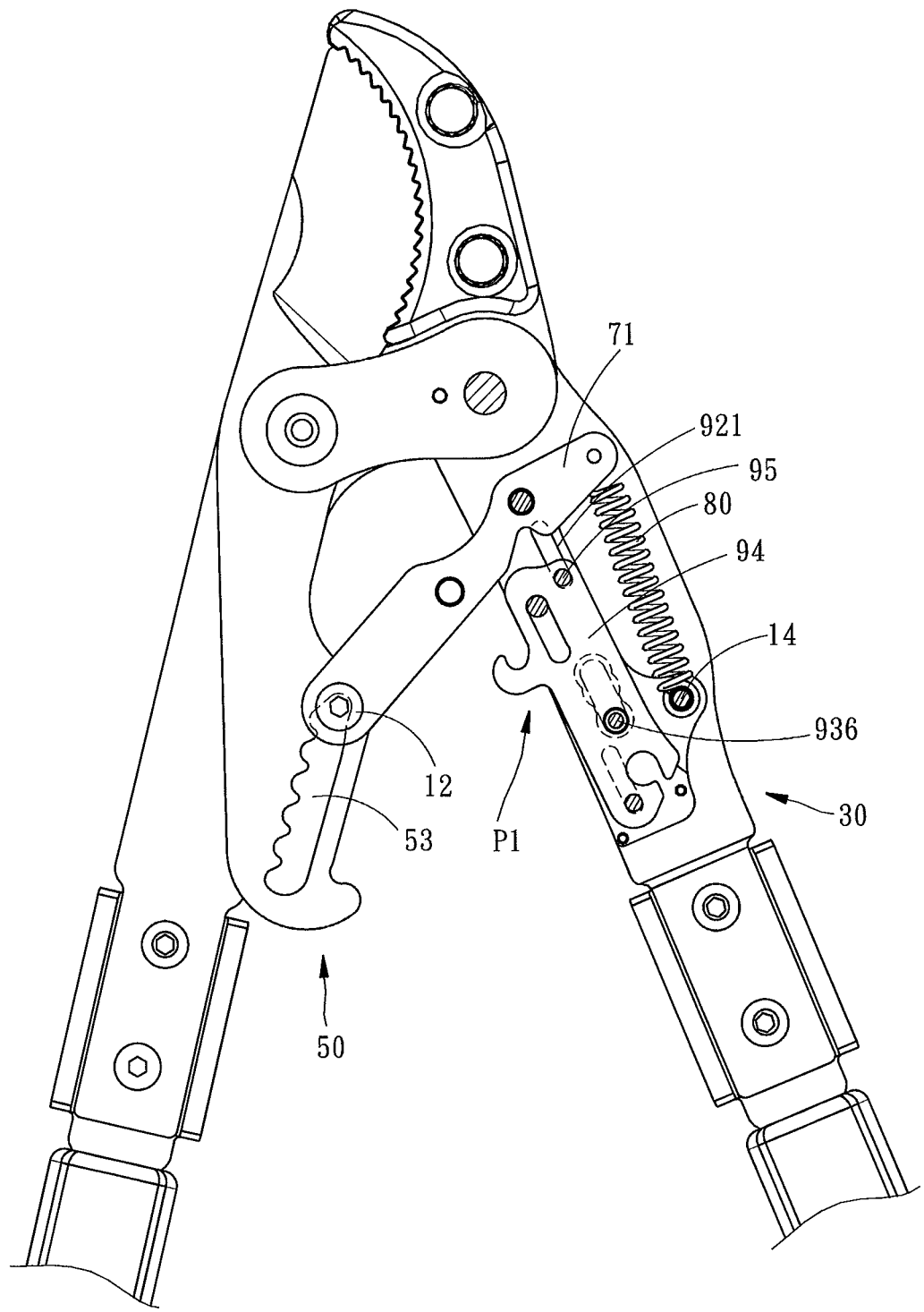
FIG. 5 is an enlarged front view of the gardening shears of the present invention, showing that a moveable plate is stayed at a first usage position.

Referring to FIGS. 1-2 and 5, a gardening shears 10 provided according to an embodiment of the present invention is shown comprising a first blade 20, a driving arm 30, two handles 40, a second blade 50, a link plate 60, a link arm 70, a spring 80 and a switching device 90.

The first blade 20 is provided at a top portion thereof with a first cutting edge 22 on which an anvil 24 is fixedly mounted.

The driving arm 30 is clamped on the first cutting edge 22 of the first blade 20 by means of two separated clamping plates 31, 32 in such a way that the top portions of the two clamping plates 31, 32 are pivotally connected with the first blade 20 via a first pivot 34. One of the two clamping plates, namely the clamping plate 31 is provided with an external guide groove 33.

A top end of one of the handles 40 is fixedly connected with the bottom end of the first blade 20, and a top end of the other of the handles 40 is fixedly connected with the bottom end of the driving arm 30.

A center portion of the second blade 50 is pivotally connected with the center portion of the first blade 20 by a second pivot 51. The second blade 50 is provided at a top portion thereof with a second cutting edge 52 which is engageable with the anvil 24 of the first blade 20. At a bottom portion of the second blade 50, a sliding groove 53 is provided. A plurality of positioning recesses 54 are provided at a side wall of the sliding groove 53 and arranged in a line.

The link plate 60 has an end, which extends into a space between the two clamping plates 31, 32 of the driving arm 30 and is pivotally connected with the first blade 20 and the driving arm 30 via the first pivot 34, and the other end pivotally connected with the first and second blades 20 and 50 via the second pivot 51.

The link arm 70 has a first pivot end 71 and a second pivot end 72. The first pivot end 71 of the link arm 70 extends into a space between the two clamping plates 31, 32 of the driving arm 30 and is pivotally connected with the driving arm 30 via a first shaft 11, and the second pivot end 72 is clamped onto the bottom portion of the second blade 50 and pivotally connected with the second blade 50 via a second shaft 12 passing through the sliding groove 53. Further, the link arm 70 is provided with a stop notch 73 located between the first and second pivot ends 71 and 72 but adjacent to the first pivot end 71. Furthermore, a center portion of the link arm 70 is inserted with a third shaft 13.

As shown in FIG. 5, the spring 80 has an end hooked on a fourth shaft 14 that is threadedly inserted into the driving arm 30, and the other end hooked on the first pivot end 71 of the link arm 70. The spring 80 is adapted for forcing the second shaft 12 to move toward a top end of the sliding groove 53 of the second blade 50.

As shown in FIG. 2, the switching device 90 includes a first fixed plate 91, a second fixed plate 92, a control latch 93, a moveable plate 94, a stop pin 95, a limiting plate 96 and a return spring 98.

The first and second fixed plates 91 and 92 are fixedly mounted in between the two clamping plates 31, 32 by means of the first and fourth shafts 11 and 14. The first fixed plate 91 is provided at a top portion thereof with a first upper guide groove 911 and at a center portion thereof with a first internal guide groove 912 corresponding in location to the external guide groove 33 of the driving arm 30. At the bottom portion of the first fixed plate 91, a first lower guide groove 913 is provided. Further, the second fixed plate 92 is provided at a top portion thereof with a second upper guide groove 921, as shown in FIG. 5, corresponding in location to the first upper guide groove 911 of the first fixed plate 91. The second fixed plate 92 is further provided at a center portion thereof with a second internal guide groove 922 corresponding in location to the first internal guide groove 912 of the first fixed plate 91. At the bottom portion of the second fixed plate 92, a second lower guide groove 923 corresponding in location to the first lower guide groove 913 of the first fixed plate 91 is provided.

The control latch 93 includes a latching member 932 extending through the external guide groove 33 of the driving arm 30 and the first internal guide groove 912 of the first fixed plate 91. The latching member 932 has a head, which extends out of the driving arm 30 and is connected with a push button 934, and a tail threadedly connected with a sleeve 936 having a limiting end portion 938. As a result, the control latch 93 can move upwards and downwards when it receives a lateral force or the control latch 93 can move along its axial direction when it is pressed axially.

The moveable plate 94 is provided at a lateral side facing the link arm 70 with a hook 942, and at a top portion thereof with a third upper guide groove 944. When the moveable plate 94 is assembled in the gardening shears 10, the moveable plate 94 is disposed between the first and second fixed plates 91 and 92 by a fifth shaft 15 that is threadedly mounted to the driving arm 30 and passes through the first and second fixed plates 91 and 92. A center portion of the moveable plate 94 is sleeved onto the sleeve 936 of the control latch 93, and a bottom portion of the moveable plate 94 is sleeved onto a guide pin 97 that has two ends inserted into the first lower guide groove 913 of the first fixed plate 91 and the second lower guide groove 923 of the second fixed plate 92. As a result, the moveable plate 94 can synchronously move upwards and downwards along with the upward and downward movement of the control latch 93.

The stop pin 95 is inserted through and fixedly connected with a top portion of the moveable plate 94, such that the stop pin 95 can synchronously move along with the moveable plate 94 upwards and downwards.

Figure 3:
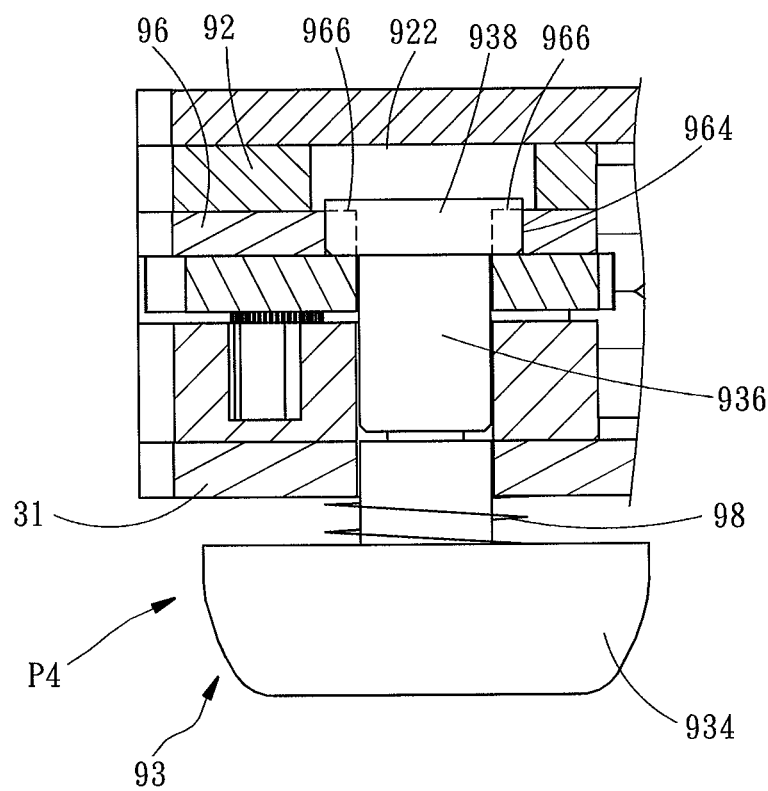
FIG. 3 is a partially cross-sectional view of the gardening shears of the present invention, showing that a control latch is stayed at a locked position.
Figure 4:
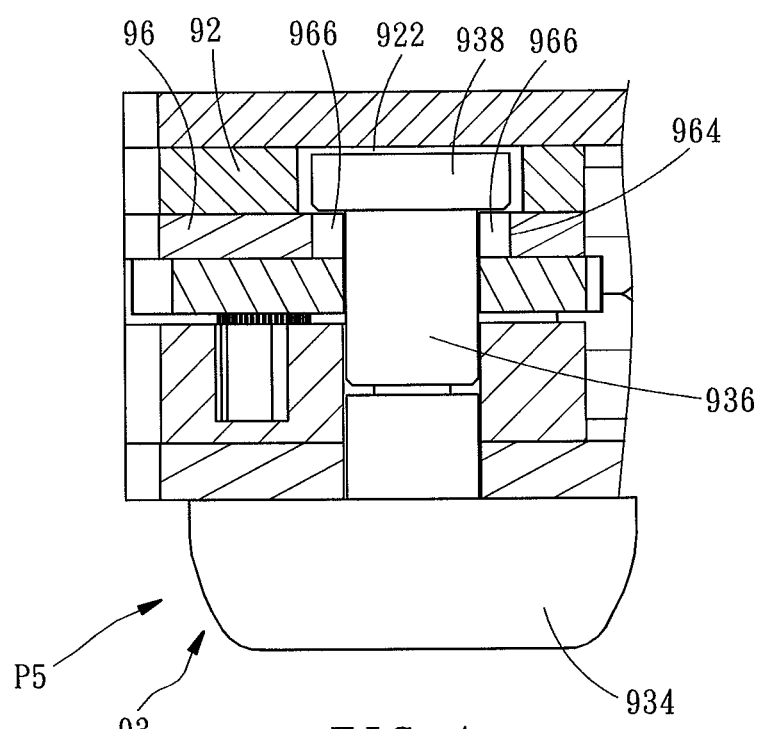
FIG. 4 is similar to FIG. 3 but showing that the control latch is pushed to a released position.

The limiting plate 96 is fixedly mounted on the surface of the second fixed plate 92 that faces the moveable plate 94 and provided at a bottom portion thereof with a third lower guide groove 962 through which the guide pin 97 passes. The limiting plate 96 is provided at a top portion thereof with a limiting groove 964 corresponding to the second internal guide groove 922 of the second fixed plate 92 and being sleeved onto the limiting end portion 938 of the sleeve 936. Further, the wall of the limiting groove 964 has two pair of limiting protrusions 966. As shown in FIGS. 3 and 4, the limiting protrusions 966 of each pair extend towards each other and have therebetween a gap smaller than the diameter of the limiting end portion 938 of the sleeve 936. By this design, when the control latch 93 receives no external pressing force thereon and is stayed at a locked position P4 as shown in FIG. 3, the limiting end portion 938 of the sleeve 936 is located in the limiting groove 964 of the limiting plate 96 and blocked by the two limiting protrusions 966, such that the control latch 93 is prohibited to move upwardly and downwardly. When the control latch 93 is pressed by an external pressing force to axially move to a released position P5 as shown in FIG. 4, the limiting end portion 938 of the sleeve 936 moves from the limiting groove 964 of the limiting plate 96 into the second internal guide groove 922 of the second fixed plate 92, such that the control latch 93 can be driven to move upwardly and downwardly.

The return spring 98 is sleeved onto the latching member 932 of the control latch 93 and stopped between the clamping plate 31 of the driving arm 30 and the push button 934 of the control latch 93 for supporting the control latch 93 to be stayed at the locked position P4 as shown in FIG. 3.

Figure 6:
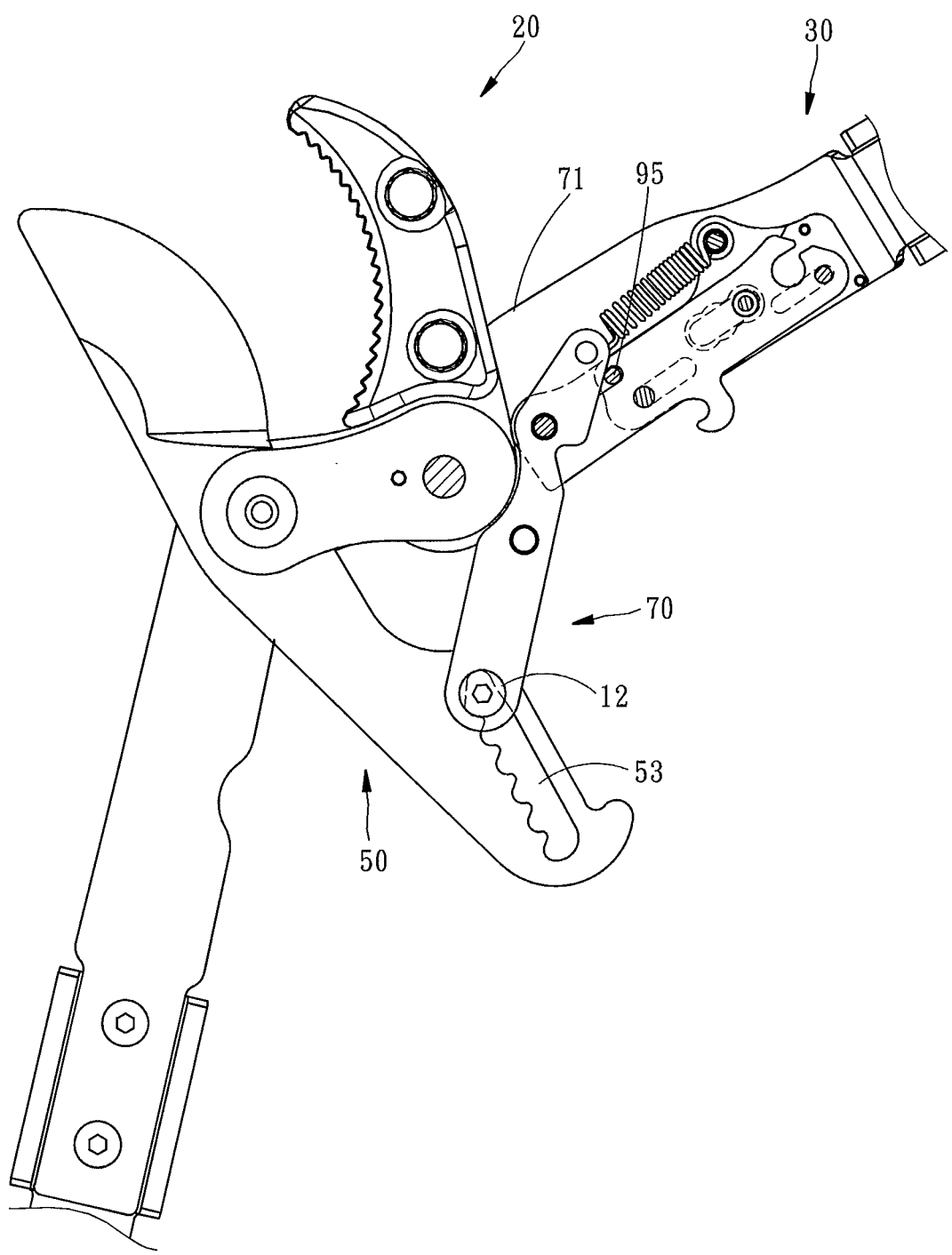
FIG. 6 is another enlarged front view of the gardening shears of the present invention, showing that the moveable plate is stayed at the first usage position and the first blade and the second blade are disengaged from each other.
Figure 7:
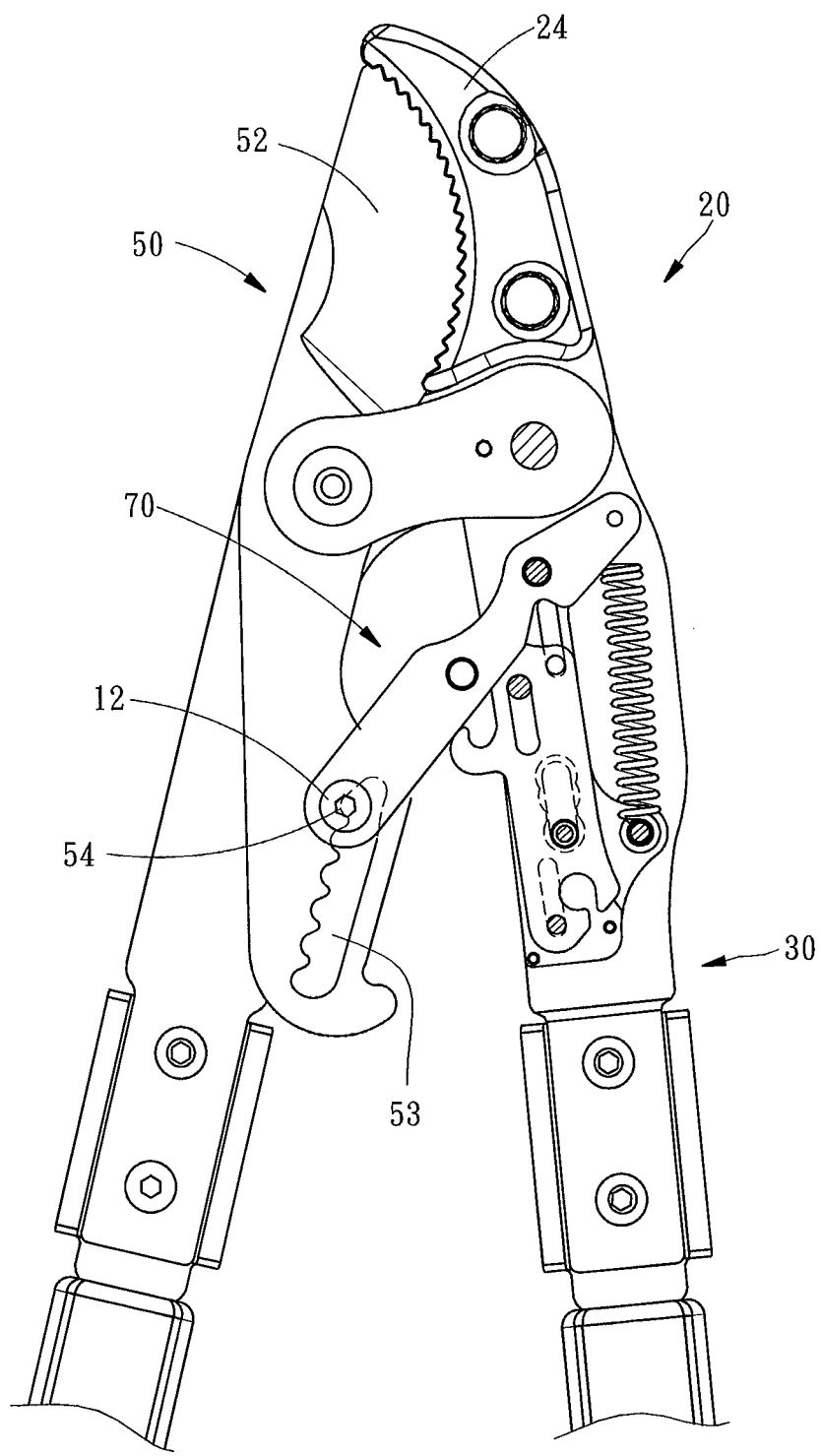
FIG. 7 is still another enlarged front view of the gardening shears of the present invention, showing that the moveable plate is stayed at the first usage position and the first blade and the second blade are engaged with each other.

For cutting a small-sized tree branch, the user can press the push button 934 of the control latch 93 to force the control latch 93 to move to the released position P5 as shown in FIG. 4. Under this circumstance, the limiting end portion 938 of the sleeve 936 of the control latch 93 is released from the interference of the limiting protrusions 966 of the limiting plate 96 and moves into the second internal guide groove 922 of the second fixed plate 92. Thereafter, the user can slide the control latch 93 downwardly to enable the sleeve 936 of the control latch 93 to drive the moveable plate 94 to move downwardly to a first usage position P1, as shown in FIG. 5, and then the user releases the pressing force exerting on the push button 934 of the control latch 93 to enable the control latch 93 to return to the locked position P4, as shown in FIG. 3, by the return spring 98. At this direct cutting mode, the user may now operate the handles 40 to drive the first blade 20 and the second blade 50 to move away from each other for cutting purpose. In the process of opening the handles 40 away from each other, the driving arm 30 will continuously pull the link arm 70 to make the second shaft 12 move to the top end of the sliding groove 53 and then pull the bottom portion of the second blade 50 so as to force the cutting edge 52 of the second blade 50 to swing towards a direction away from the cutting edge 22 of the first blade 20 until the stop pin 95 is abutted against the first pivot end 71 of the link arm 70. Under this condition, the first and second blades 20 and 50 are opened to a maximum extent in this cutting mode, as shown in FIG. 6. Thereafter, the user can operate the handles 40 to drive the first and second blades 20 and 50 to close relative to each other for cutting tree branch. In the process of closing the handles 40, the driving arm 30 will push the link arm 70 to make the second shaft 12 move from the top end of the sliding groove 53 to the positioning recess 54 next to the top end of the sliding groove 53, as shown in FIG. 7, and then by means of the engagement of the second shaft 12 with the aforesaid positioning recess 54 and by continuously exerting force on the handles 40 to close the handles 40, the link arm 70 will push the second blade 50 to force the second cutting edge 52 of the second blade 50 to swing towards the first cutting edge 22 of the first blade 20 until the second cutting edge 52 is abutted against the anvil 24 of the first blade 20 so as to cut off the small-sized tree branch.

Figure 8:
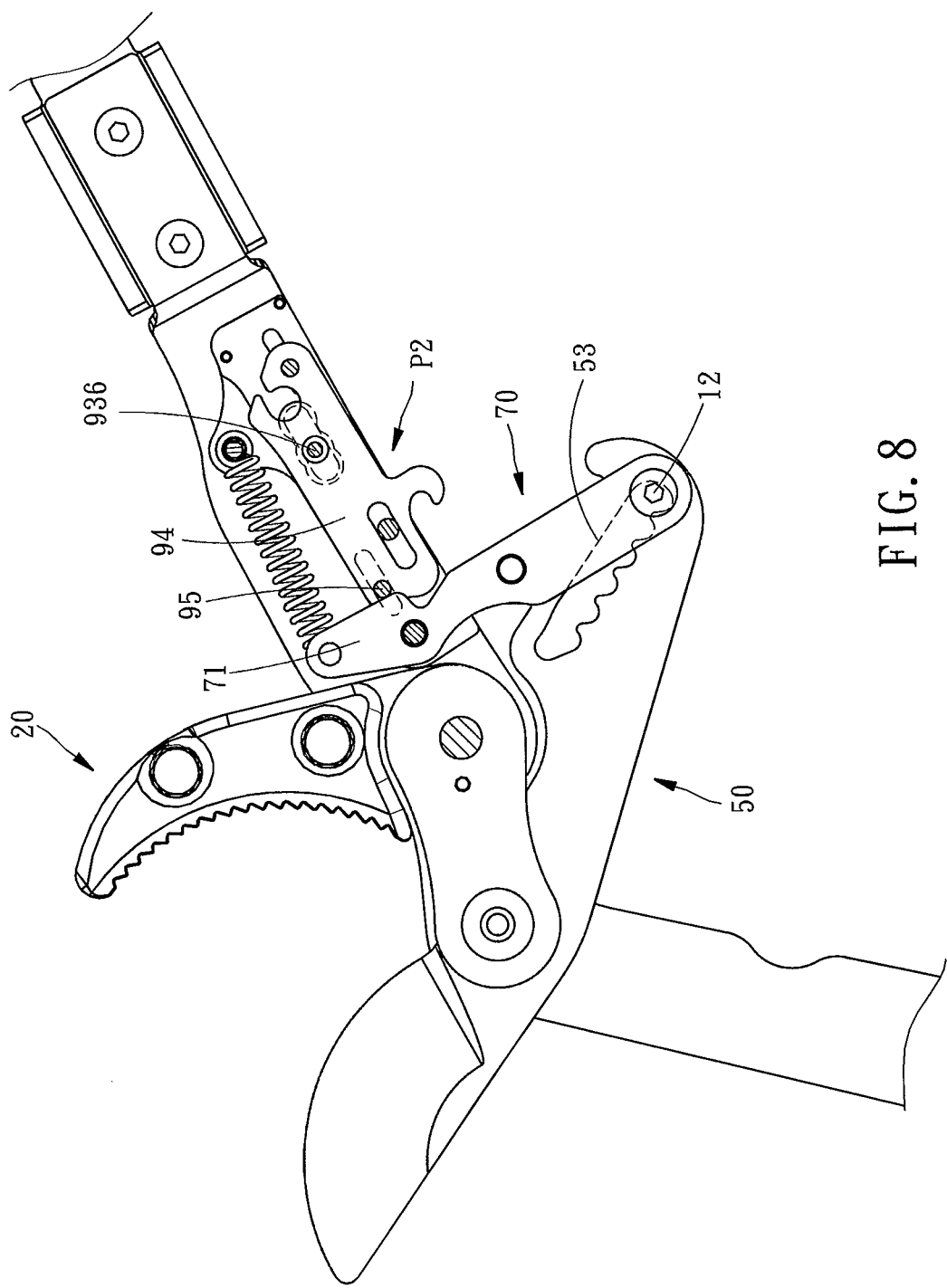
FIG. 8 is an enlarged front view of the gardening shears of the present invention, showing that the moveable plate is stayed at a second usage position and the first blade and the second blade are disengaged from each other.
Figure 9:
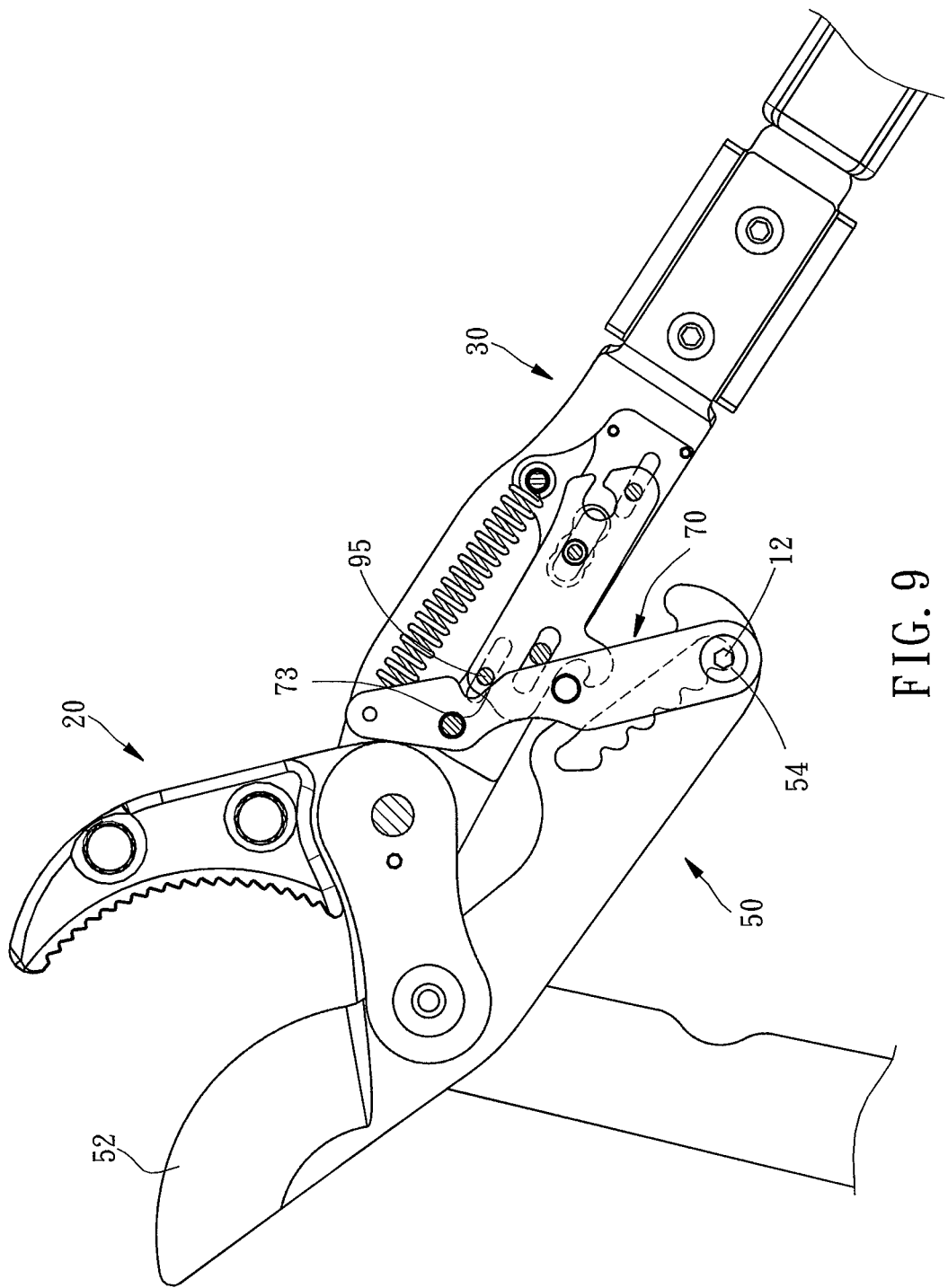
FIG. 9 is another enlarged front view of the gardening shears of the present invention, showing that the moveable plate is stayed at the second usage position and a stop pin is engaged with a stop notch of a link arm.

To cut off tree branch having a relatively larger diameter, the user may select a stepwise cutting mode for saving labor. For achieving this purpose, the user can press the push button 934 of the control latch 93 to force the control latch 93 to move to the released position P5 as shown in FIG. 4. Thereafter, the user can slide the control latch 93 upwardly to enable the sleeve 936 of the control latch 93 to drive the moveable plate 94 to move upwardly to a second usage position P2, as shown in FIG. 8, and then the user releases the pressing force exerting on the push button 934 of the control latch 93 to enable the control latch 93 to return to the locked position P4, as shown in FIG. 3. And then, the user can operate the handles 40 to drive the first blade 20 and the second blade 50 to move away from each other. In the process of opening the handles 40 away from each other, the stop pin 95 will continuously push the first pivot end 71 of the link arm 70 to make the second shaft 12 slide along the sidling groove 53 and synchronously drive the cutting edge 52 of the second blade 50 to swing towards a direction away from the cutting edge 22 of the first blade 20 until the second shaft 12 slides to the bottom end of the sliding groove 53. Under this condition, the first and second blades 20 and 50 are opened to a maximum extent in this cutting mode, as shown in FIG. 8. Thereafter, the user can operate the handles 40 to drive the first and second blades 20 and 50 to close relative to each other for cutting large-sized tree branch. In the process of closing the handles 40, the driving arm 30 will push the link arm 70 to make the second shaft 12 move to one of the positioning recesses 54, and then by means of the engagement of the second shaft 12 with the aforesaid positioning recess 54 and by continuously exerting force on the handles 40 to close the handles 40, the link arm 70 will push the second blade 50 to force the second cutting edge 52 of the second blade 50 to cut into the large-sized tree branch at a certain depth where the tree branch is not completely cut off until the stop pin 95 is engaged with and stopped at the stop notch 73 of the link arm 70, as shown in FIG. 9. At this circumstance, applying extra force on the handles 40 can not close the handles 40 further. For completely cutting off the tree branch, the user needs at this moment to release the force exerting the handles 40 for closing the handles 40 and then pull the handles 40 for opening the handles 40 again. When the handles 40 are re-opened, the second shaft 12 will move upwardly along the sliding groove 53 to another positioning recess 54 for enabling the user to close the handle again to cut the tree branch deeper. By means of operating the handles to close and then open repeatedly, the large-sized tree branch can be stepwise cut off eventually.

Figure 10:
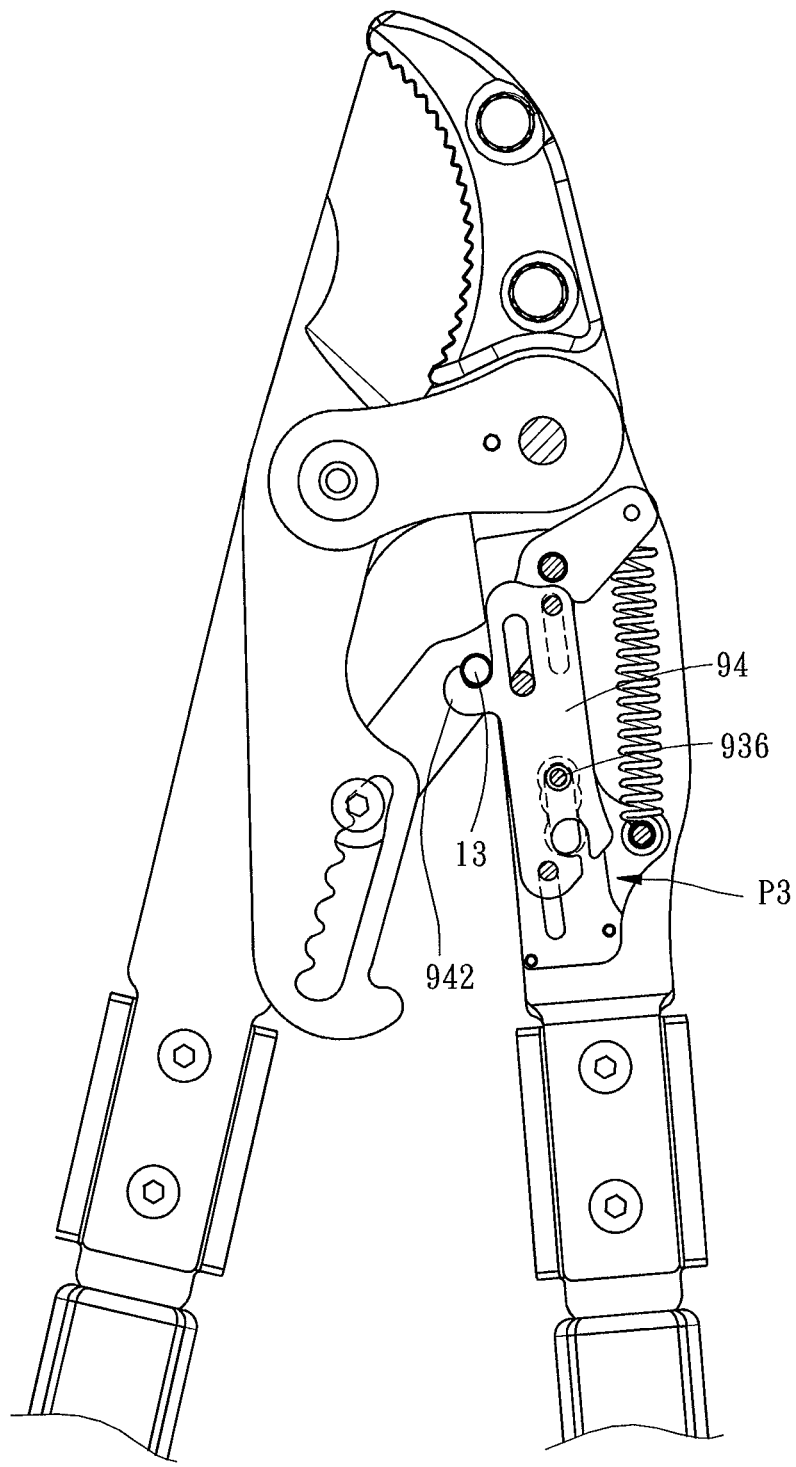
FIG. 10 is an enlarged front view of the gardening shears of the present invention, showing that the moveable plate is stayed at a third usage position.

To prevent injury of the user or a third party due to unintentionally opening the first and second blades 20 and 50, after the gardening shears is used the user can operate the control latch 93 to move to the released position P5 as shown in FIG. 4, and then move the moveable plate 94 upwardly to a third usage position P3 by the sleeve 936 of the control latch 93, such that the hook 942 of the moveable plate 94 is hooked on the third shaft 13, as shown in FIG. 10, so as to prohibit pivotal movement of the handles 40, achieving safety of the gardening shears in storage.

In conclusion, the gardening shears 10 of the present invention allows the user to select one of the two cutting modes subject to the size of the tree branch by means of the switching device 90, fulfilling the flexible requirement and enhancing the efficiency in cutting work.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gardening shears comprising:
    a first blade;
    a driving arm having a top end pivotally connected with the first blade, and an external guide groove;
    two handles, one of the handles having a top end fixedly connected with a bottom end of the first blade and the other of the handles having a top end fixedly connected with a bottom end of the driving arm;

a second blade pivotally connected with the first blade and provided with a sliding groove having a side wall, and a plurality of positioning recesses linearly arranged at the side wall of the sliding groove;

a link arm having a first pivot end pivotally connected with the driving arm via a first shaft, a second pivot end pivotally connected with the second blade via a second shaft which is slidable in the sliding groove of the second blade and engageable with one of the positioning recesses, and a stop notch located between the first and second pivot ends and adjacent to the first pivot end;

a spring installed between the driving arm and the first pivot end of the link arm; and a switching device including a control latch upwardly and downwardly moveable in the external guide groove of the driving arm and being at a distance from the first pivot end of the link arm, a moveable plate disposed at the driving arm and connected with the control latch, and a stop pin connected with a top portion of the moveable plate, and the stop pin being moveable to stop at the first pivot end of the link arm or engage with the stop notch of the link arm when the driving arm is pivotally turned relative to the first blade;

wherein the moveable plate and stop pin synchronously move upwards and downwards along with the upward and downward movement of the control latch, and the link arm is not synchronously moved upwards and downwards along with the upward and downward movement of the control latch; and wherein the switching device further comprises first and second fixed plates mounted inside the driving arm and located at two opposite sides of the moveable plate, respectively; the first fixed plate has a first internal guide groove corresponding to the external guide groove of the driving arm; the second fixed plate has a second internal guide groove corresponding to the first internal guide groove; the control latch includes a latching member upwardly and downwardly moveable in the external guide groove of the driving arm and the first internal guide groove of the first fixed plate, and a sleeve upwardly and downwardly moveable in the second internal guide groove.

2. The gardening shears as claimed in claim 1, wherein the first fixed plate is provided at a top portion thereof with a first upper guide groove, and the second fixed plate is provided at a top portion thereof with a second upper guide groove; the stop pin is upwardly and downwardly moveable in the first and second upper guide grooves.

3. The gardening shears as claimed in claim 1, wherein the switching device further comprises a limiting plate mounted to the second fixed plate and provided with a limiting groove corresponding to the second internal guide groove of the second fixed plate, and at least two limiting protrusions extending from a wall of the limiting groove towards each other and defining therebetween a gap; the sleeve has a limiting end portion having a diameter greater than the gap of the at least two limiting protrusions; when the control latch is located at a locked position, the limiting end portion of the sleeve is located in the limiting groove of the limiting plate and blocked by the two limiting protrusions, such that the control latch is prohibited to move upwardly and downwardly; when the control latch is pressed to move from the locked position to a released position, the limiting end portion of the sleeve moves away from the limiting groove of the limiting plate and is upwardly and downwardly moveable in the second internal guide groove of the second fixed plate.

4. The gardening shears as claimed in claim 3, wherein the control latch further comprises a push button connected with a head of the latching member and exposed outside the driving arm; the switching device further comprises a return spring sleeved onto the latching member and stopped between the driving arm and the push button for holding the control latch at the locked position.

5. The gardening shears as claimed in claim 3, wherein the first fixed plate is provided at a bottom portion thereof with a first lower guide groove, the second fixed plate is provided at a bottom portion thereof with a second lower guide groove, and the limiting plate is provided at a bottom portion thereof with a third lower guide groove; the moveable plate is provided at a bottom portion thereof with a guide pin upwardly and downwardly moveable in the first, second and third lower guide grooves.

6. The gardening shears as claimed in claim 1, wherein the link arm is provided at a center portion thereof with a third shaft, and the moveable plate is provided at a lateral side thereof with a hook hooked on the third shaft by an upward movement of the moveable plate or released from the third shaft by a downward movement of the moveable plate.

* * * * *